Oct. 3, 1944.  A. B. BOK  2,359,295
MILLING MACHINE
Filed Feb. 3, 1939  4 Sheets-Sheet 4

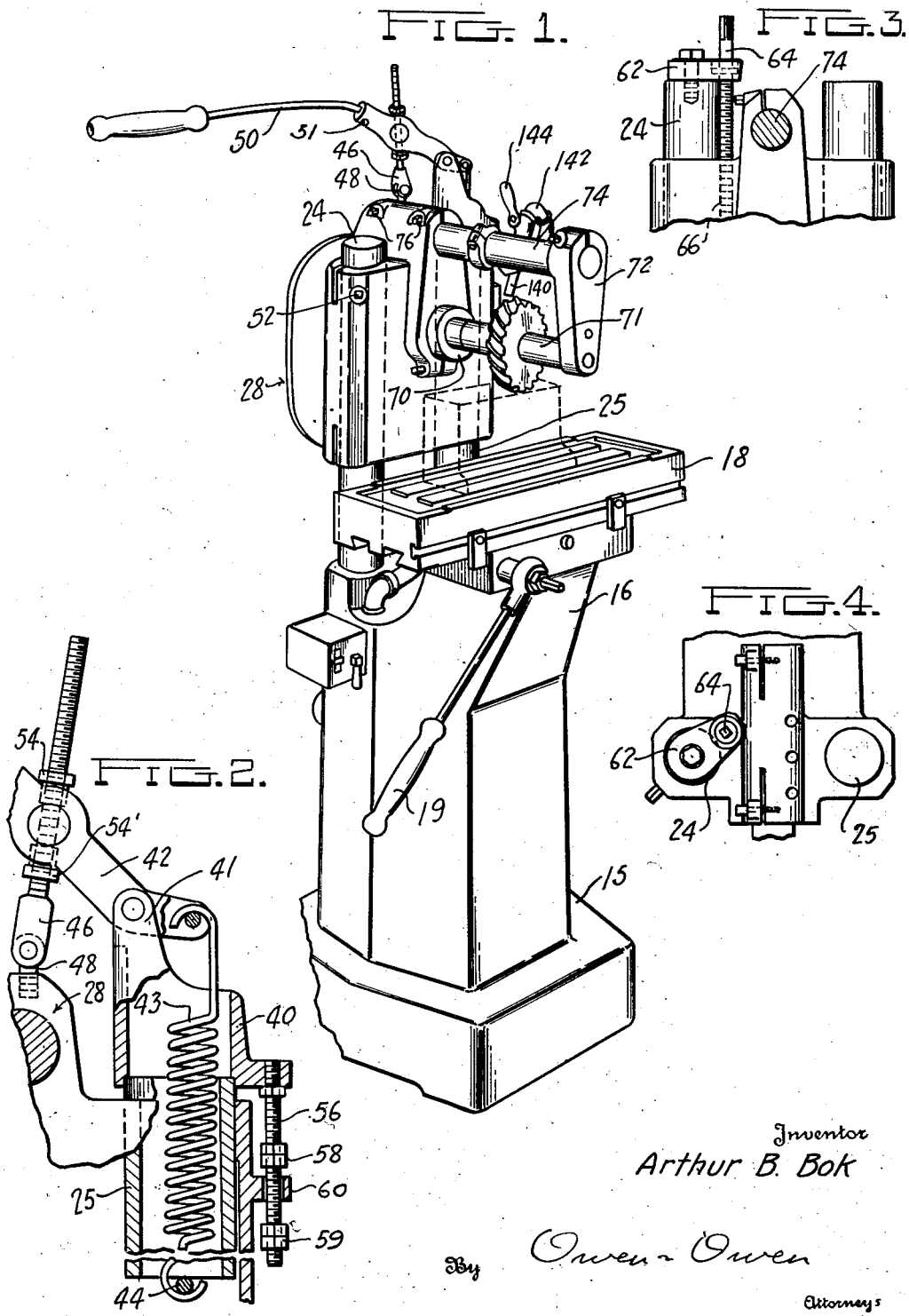

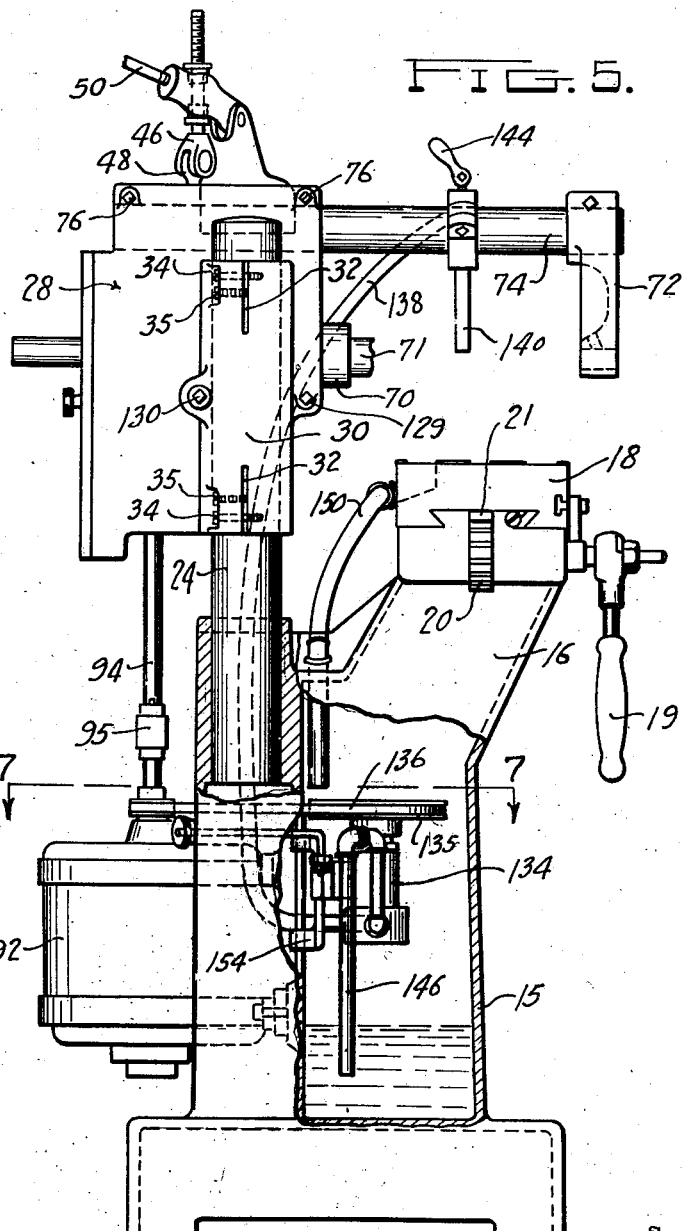

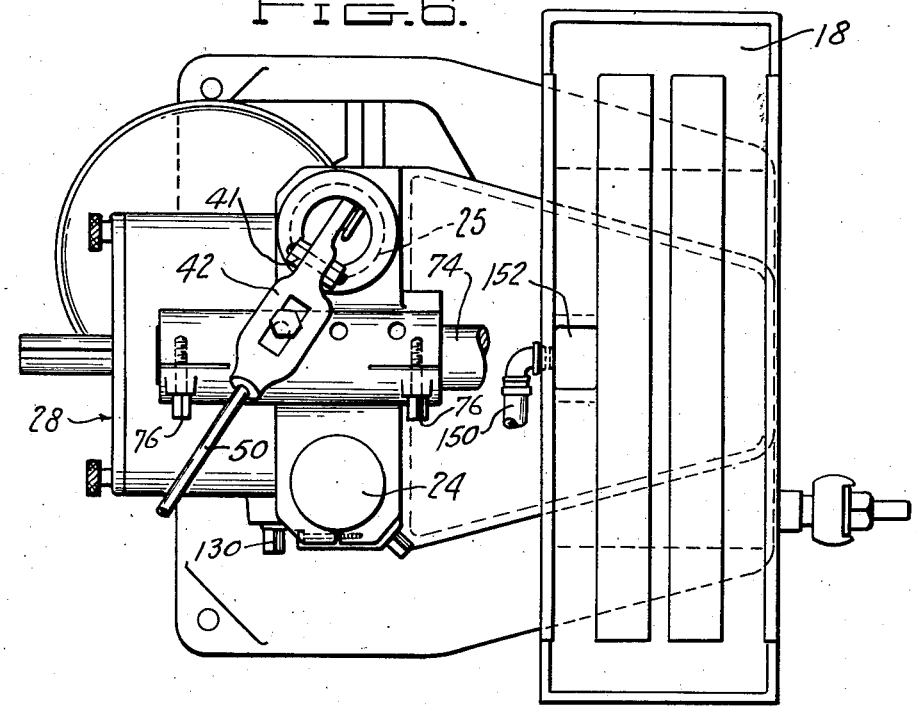
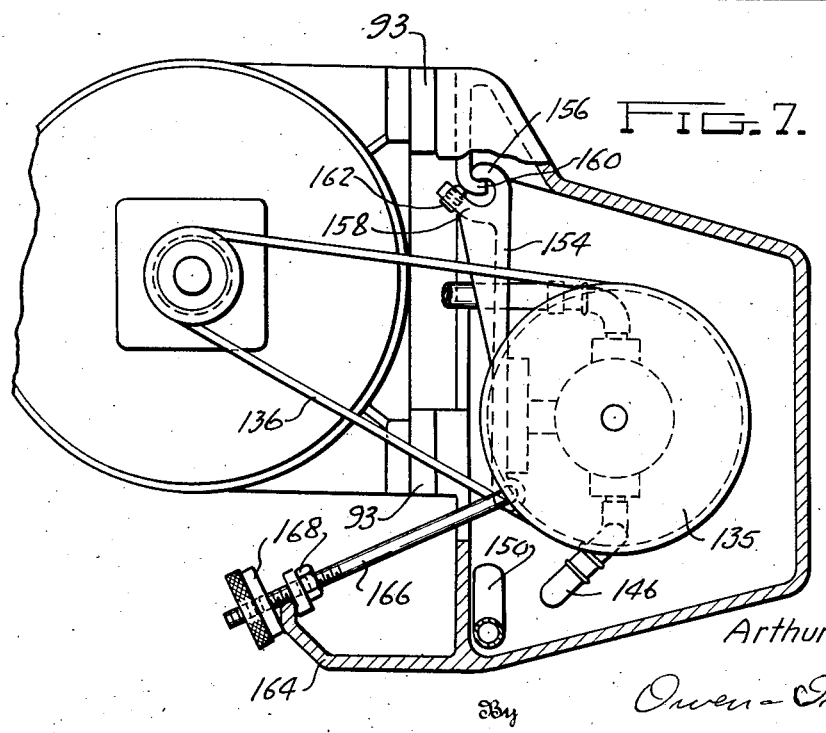

Inventor
Arthur B. Bok
By Owen & Owen
Attorneys

Patented Oct. 3, 1944

2,359,295

UNITED STATES PATENT OFFICE 2,359,295

MILLING MACHINE

Arthur B. Bok, Toledo, Ohio, assignor to Kent-Owens Machine Company, Toledo, Ohio, a corporation of Ohio Application February 3, 1939, Serial No. 254,364

19 Claims. (Cl. 90—15)

This invention relates to machine tools and is particularly directed to a milling machine having novel features of construction.

The primary object of the invention is the provision of a milling machine in which the parts are mounted for easy and accurate operation, and which has certain structural improvements.

One important improvement is the mounting of the head upon vertical cylindrical posts, whereby accuracy of operation is facilitated. Other improvements will appear from the following specification, reference being had to the accompanying drawings, in which—

Figure 1 is a perspective view of a milling machine embodying the present invention;

Fig. 2 is a fragmentary sectional view showing a detail of a counterbalancing mechanism and head control;

Fig. 3 is an elevational view of an alternate form of head control;

Fig. 4 is a top plan view of the parts shown in Fig. 3;

Fig. 5 is a side elevation of the machine, with parts broken away;

Fig. 6 is a top plan view of the machine shown in Fig. 1, with parts broken away;

Fig. 7 is a section on line 7—7 of Fig. 5;

Figure 8:
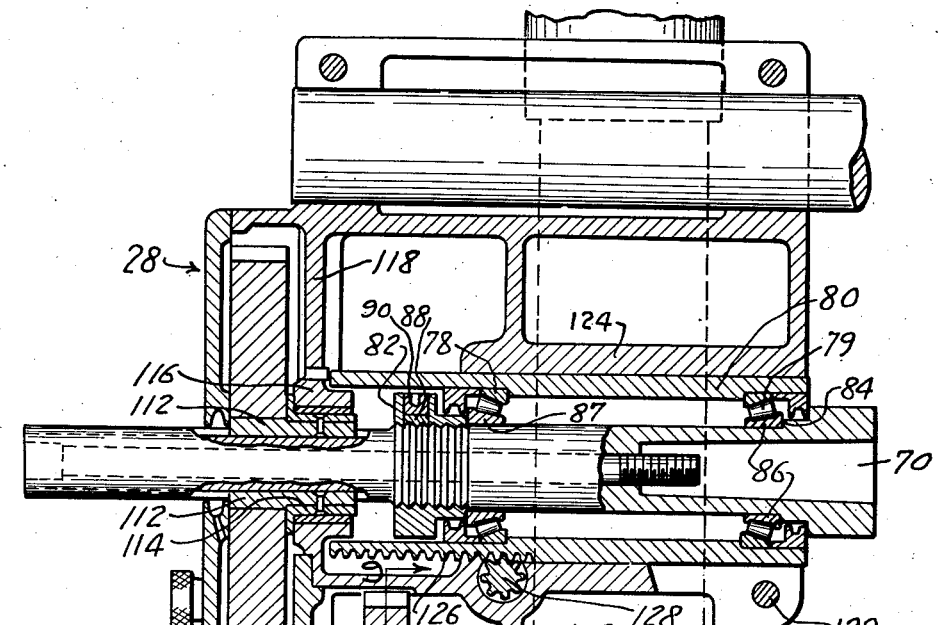
Fig. 8 is a central vertical section of the head of the machine.
Figure 9:
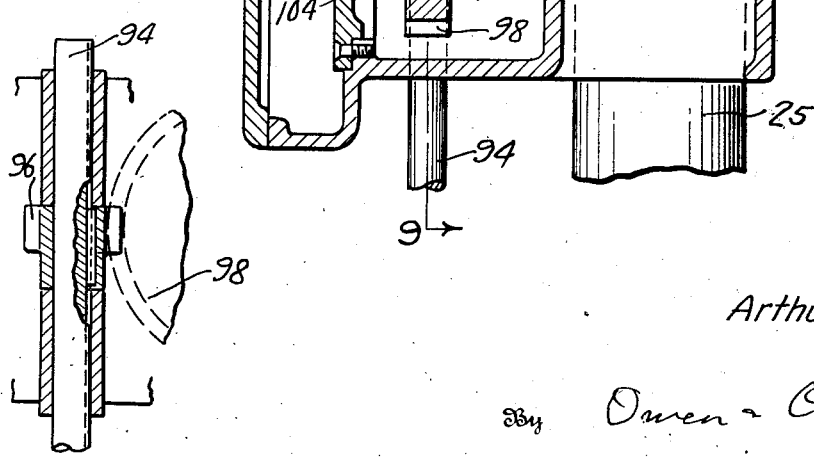
Fig. 9 is a detail view of the spindle drive connection.

Referring to the drawings, and particularly to Fig. 1, the present invention is shown as embodied in a milling machine having a pedestal bed 15 provided with a support 16 for a table 18 gibbed for lateral movements relative to the bed and operated by a handle 19 which turns a pinion 20 meshing with a rack 21 carried by the table. Obviously, any suitable moving means may be employed to impart movement to the table relative to the bed.

Spaced cylindrical posts 24 and 25 extend upwardly from the bed at each side of the back part thereof. The head, designated 28, is mounted for sliding vertical movements on the posts 24, 25, and carries the spindle mechanism which is more fully described below.

The parts of the head which are in engagement with the posts 24, 25 comprise long bearing members 30 slotted at each end, as at 32, and provided with oppositely acting adjusting screws 34 and 35, screw 34 being threaded into the far side of the split bearing and having its head abutting the near side, and screw 35 being threaded into the near side of the bearing and having its nose abutting the far side. It will be seen that by taking up one screw or the other the width of the slot 32 and hence the diameter of the adjacent bearing surface may be adjusted. The long bearing members 30 are each relieved in the center so that only relatively small surfaces at each end are actually in engagement with the posts. The wide separated bearing points act to prevent tilting of the head. The weight of the head itself is divided about equally to the front and rear of the posts to minimize any tendency to tilt and to provide for easy vertical movement without binding.

The mechanism provided to control the vertical position of the head 28 on its supporting posts 24, 25 is shown in alternate forms in Figs. 1, 2, 3 and 4. According to the form shown in Figs. 1 and 2, a hollow cap piece 40 is mounted on the top of one of the supporting posts, for example 25, and is provided with a bifurcated projection 41. A lever 42 is fulcrumed between the arms of the projection and has one arm extending over the hollow post 25 where it is attached to a counterbalancing spring 43, which extends down through the post to engage a fixed pin 44, which may be carried diametrically across the bottom of the post. The other end of the lever 42 is attached to a connecting rod 46, which is connected by means of an eyebolt 48 to the head 28. As shown in Fig. 6, at least two holes are provided in the top of the head 28 for the reception of the eyebolt 48, so that the operator may vary the position of the connection at will. An operating arm 50 is fixed by set screw 51 in a socket in the extreme end of lever 42 and is bent to stand at an angle with the lever. By adjusting the position of the eyebolt 48 in the head and of the arm 50 in the socket, the operator may place the handle in almost any desired position, wherever he finds it most convenient. A set screw 52 is provided for engagement with the post 24 to fix the head in adjusted position when desired. The arms of lever 42, on each side of the fulcrum, are disposed at an angle to each other, and the arm over the hollow post lies in a substantially horizontal position when the head is elevated. The angle of the arms is calculated so that the change in their relative effective lengths compensates for the increased tension of spring 43 as the head is lowered, and the decreased tension of the spring when the head is raised, so that the spring accurately counterbalances the weight of the head in all positions of the lever.

The connection between the lever 42 and the connecting rod 46 is adjustable lengthwise of the rod so that various ranges of operation may be had. For instance, if a very high piece of work is to be milled, it is obvious that the head should be working near the top of the posts. For this purpose, the connection will be made near the lower end of the rod 46 by properly adjusting the follower nuts, designated 54, 54'. If work is to be performed on a block of less height, the connection between the lever 42 and rod 46 will be established near the top of the latter so that movements of the head will be in the lower range on the posts. For any particular setting of the connection between the lever 42 and rod 46, the extent of the movement may be limited by any suitable device, such as a screw 56 carried by the cap 40 and in turn carrying upper and lower stop nuts 58 and 59 which abut against an ear 60 extending from the head. Thus, as the head reaches the lower limit of its set movement, the ear 60 will abut the lower stop nut 59, and, as the head is raised and reaches the upper limit of its travel, it will abut against the upper stop nut 58.

The alternate form of head control shown in Figs. 3 and 4 comprises a cap 62 carried by one of the cylindrical posts and having an arm extending out over the adjacent surface of the head. A feed screw 64 rotates in the cap and is received in a correspondingly threaded socket 66 in the head. As the feed screw 64 is rotated, the head will be moved up or down on the cylindrical posts. This form of control may be used with or without a counterbalancing spring.

As shown in Figs. 1, 5 and 8, a spindle 70 is mounted in the head 28 and drives an arbor 71 supported at its outer end by an arbor support 72 carried by an overarm 74. The overarm 74 is held in the top of the head 28 by a split bearing extension of the head, and is gripped between the surfaces of the extension by clamp bolts 76. As the split extension is cut away intermediate its ends, the points of support for the overarm 74 are widely spaced and act to prevent tilting of the overarm even under heavy load.

The spindle 70 is rotatably mounted, by suitable spaced anti-friction bearings 78, 79, in a quill 80. A follower member 82 is threaded on the rear of the spindle and draws the spindle rearwardly with respect to the quill so that a front shoulder 84 abuts against the rotating bearing race 86 of the front bearing 79, while the follower member abuts against a similar race 87 of the rear bearing 78. The spindle is thus held against end play with respect to the quill. A suitable binding block 88 is provided in the follower member 82 and holds the latter in adjusted position when forced down on the threaded portion of the spindle by a set screw 90 disposed in the body of the follower.

A motor 92 is provided to drive the spindle and is mounted on the base 15 near the floor to prevent vibration of the machine. The motor mount is provided with shim blocks 93 which are easily replaceable to accommodate various sizes of motors. A drive shaft 94 is connected to the motor through a flexible joint 95 which provides for slight inaccuracies of alignment. A spiral gear 96 within the head 28 is keyed upon shaft 94 and slides longitudinally thereon as the operator moves the head up or down. A spiral gear 98 engages the gear 96 and is, in turn, keyed on a shaft 100 journaled in the head, at one end on a cross-frame member 102 and at the other end on a removable bearing plate 104. The cross-frame 102 and the bearing plate 104 each carry inwardly extending hubs, which increase the bearing area for the shaft 100 and prevent axial movement of spiral gear 98, and set screw 103 prevents axial movement of shaft 100 with respect to spiral gear 98. The shaft 100 extends through the bearing plate 104 and has keys 108 pinned thereon. A change gear 106 may be slipped over and driven by the keys and shaft. The change gear 106 meshes with a change gear 110. Keys 112 are fixed upon a rotating bearing member 114 journaled in a bearing 116 carried by a rear cross-frame member 118. The keys 112 slide in keyways in gear 110 and in long keyways formed in the spindle, so that the same driving connection is maintained as the spindle is fed in and out of the head.

A rear cover plate 120 is provided which closes the back of the head when the parts are in assembled position, and which serves to hold the change gears or pick-off gears 106 and 110 against rearward movement on their respective shafts. The cover plate is made easily removable and, when it is taken from the head, the change gears 106 and 110 may be slid off their respective shafts without disturbing any of the rest of the parts in the head. If it is desired to change the speed ratio between the driving motor 92 and the spindle, this may be readily done by changing the relative size of gears 106 and 110.

The speed change provided in this way is all that is required ordinarily, the speed of the motor and the ratio of spiral gears being selected to suit the range of speeds for which the mill is intended. Where wider speed change is required, it may be provided by using a motor having different speeds, or in any other suitable way.

If preferred, bevel gears may be substituted for spiral gears 96 and 98. In either case, the direction of rotation of the spindle may be reversed by reversing the motor or drive shaft.

The quill 80 is carried slidably in a long journal 124. The quill is provided with a rack 126 at one side which meshes with a pinion 128, which may be turned from the outside of the head by applying a suitable tool to the end of the shaft 130 on which the pinion is mounted. (Figs. 6 and 8.) The quill may be locked in adjusted position by lock bolt 129.

When desired, the following means to flow a cooling fluid over the work in progress is provided. This means embodies new and advantageous features. The bed of the machine is made hollow and is open at the back to provide for the ready insertion of a pump 134, which has a pulley 135 driven from the driving motor 92 by a belt 136. A discharge conduit 138 from the pump extends up the side of the machine and is connected to a spout 140 through a valve 142, which is controlled by a suitable lever 144, so that the rate of discharge of the cooling fluid may be varied. The spout is mounted on overarm 74 in such a way that its position and direction can be altered at will so as to direct the cooling fluid to the point where it is needed. An intake pipe 146 extends down into a tank which is formed in the hollow bed of the machine and which holds a quantity of cooling fluid. The return to the tank is made through a suitable connection 150 from a sump 152 in the table. The table drain troughs are sloped toward the sump so that the fluid will flow readily back into the tank, to be recirculated by the pump 134.

The pump 134 is held in the bed by a bracket 154, which is provided at its free end with hook-shaped fingers 156, and thumbs 158. The fingers 156 hook around ears 160, which are struck from an upstanding side of the bed, and are held in interlocking relation by any suitable means, such as set screws 162 in the thumbs 158.

A rearwardly extending flange 164 is formed at one side of the bed. A rod 166, which has one end connected to an end of bracket 154 on which the pump is held, extends out through the open rear side of the bed and is provided at its outer end with oppositely disposed control nuts 168, which engage the extremity of flange 164. The rod 166 holds the pump against rotation around the ears 160 and may also act as a belt tightener for the driving connection between the pump and motor. It will be seen that, if it is desired to take up on the driving belt, the rod 166 may be moved inwardly by adjusting nuts 168 from the outside of the machine. The pump is thus held in place in the bed only by the connection between the fingers of bracket 154 with the ears 160 of the bed and is held against rotation about these ears by the rod 166. The hinge connection established by the fingers 156 and the ears 160 need not be carefully made or machined, since sufficiently accurate positioning of the pump relative to its driving motor may be established by rod 166. Rod 166 may be shortened or disengaged from flange 164 so as to loosen belt 136 and stop the pump when desired. Preferably the pump is constructed so that it forces the fluid in the same direction regardless of the direction of rotation of pulley 135.

The operation of the milling machine will be apparent from the foregoing description, but may be briefly summarized as follows:

The work is mounted upon the table in the accustomed manner. The only movement of the table is by handle 19 transversely beneath the arbor. The arbor can be moved longitudinally by releasing screws 76 and 129 to permit movement of the outboard support and quill and operation of pinion 128 by a suitable handle attached at 130. The entire head and the arbor therewith may be raised or lowered by handle 50 or by screw 64 in accordance with the form of control of the head employed, and the head may be locked against such vertical movement by set screw 52. Longitudinal movement of spiral gear 96 upon shaft 94 permits vertical movement of the head without interfering with the drive. A longitudinal movement of the quill spindle and arbor is permitted by the keyed drive from gear 110, while at the same time that gear and its pinion 106 may be freely removed when the rear cover plate 120 is removed, so that different sized gears may be slipped on to the respective shafts and the speed of the spindle changed. Because of the mounting of the motor, it is a very simple matter to use a machine in other respects the same with a smaller or larger motor, as required. The pump may be easily attached as shown and described, or may be omitted if not required or if other cooling arrangements are preferred.

By this very simple construction, a very considerable flexibility is obtained with a minimum of adjustments. It is advantageous for many kinds of work because there is no projecting knee which might interfere with easy operation by the workman. The flexibility of the attachment of handle 50 for raising and lowering the head is likewise a great convenience for the operator. Also, the handle 50 and its associated parts may be readily removed as a unit when the head is to be permanently fixed in position for continuous work upon an article produced in large quantities or where vertical adjustment by other means, such as the screw 64, is preferred.

It will be readily apparent that the drive described is very simple and comprises a minimum of gears, and consequent lost power, with a maximum of possible adjustment for different speeds to suit various operations. This is particularly essential in a machine which is to be used for general purposes.

One of the most important features of the apparatus is the arrangement for guiding the vertical movements of the head. By mounting the head upon spaced posts which are completely surrounded by the head, the head is held in the desired position more rigidly than where the usual flat or dovetailed guideways are employed. This is because the tilting or movement of the head in any direction is resisted by parallel posts and, particularly where cylindrical posts are employed, pressure upon the head at any angle is resisted by portions of the surrounding sleeves which are normal to the surfaces of the posts. This reduces the possible movement of the head to the smallest possible amount with a given clearance between the surrounding socket and the post. Where the relative movement may be at an angle to the surfaces, the movement may be actually much greater than the clearance. Also, the points which resist the twisting force upon the head are always at relatively widely spaced points so that but little movement of the tool is allowed as a result of the forces thus exerted. As a consequence, more accurate work can be done with a head mounted in this way than where a head is mounted in flat or dovetail guideways with an equal amount of clearance.

Another feature of this method of mounting is the fact that the two posts react to maintain the head verical regardless of any forces applied to or through the tool tending to twist the head in a horizontal plane. To explain this more fully, it may be presumed that in operating the milling machine, there is force exerted tending to twist the head in an anti-clockwise direction, as viewed in Fig. 6. The top bearing in such a case would tend to move the post, appearing at the upper side of Fig. 6, to the left and the post, appearing at the lower side of Fig. 6, to the right, but due to the lower bearings on the post, such a movement of the post at the upper side of Fig. 6 would tend to elevate the outboard support, while the movement of the lower post, as viewed in Fig. 6, would tend to lower the outboard support. These forces would operate against each other to maintain the outboard support horizontal. This has two advantages. In the first place, it maintains the outboard support and tool at the predetermined level and also prevent any bending of the posts. In order to produce any such bending, it would be necessary to produce in each post an S-curve between where the post is held in the bed of the machine and where it is held in the bottom of the head, since the post is held vertical in the bed and is held vertical in the head. Not only would a tilting of the head affect the work, but it would also affect the spindle drive, so that by maintaining the alignment of the head, the ease with which the spiral drive gear 96 moves on drive shaft 94 is not disturbed.

The complete surrounding of each post by the head maintains the posts at exactly the determined distance apart so that there can be no play created by spreading of the posts. It maintains them parallel so that there can be no tilting or movement of the head caused by relative movements of the posts in any direction. This is believed to be the explanation for the fact that the construction provides an extremely rigid and certain positioning of the head and tool, while permitting a construction that is much lighter than is necessary with the conventional flat or dovetail slideway.

Another advantage of the cylindrical post construction is that the head resists movement in all directions equally. With the usual dovetail mounting, the amount the head yields depends upon the direction in which force is applied, and the reaction of the head in performing any given work is difficult if not impossible to calculate in advance of actual trial. Such heads frequently "chatter," and with some work chatter least with the work stroke in one direction and with other work chatter least with the work stroke in the opposite direction. Troublesome "chatter" is greatly minimized by the cylindrical vertical posts, and the equal resistance to forces applied in all directions makes the direction of the working stroke immaterial. Therefore, the difficulties resulting from the yielding of the head during the milling operation are minimized by the cylindrical posts to a surprising degree.

The strict limitation of the movement of the head in response to working forces facilitates the driving of the spindle from a vertical shaft in the manner disclosed without the cramping of the shaft due to movement of the head.

What I claim is:

1. In a milling machine, a bed, a work table supported on the bed, a head carrying a spindle and arbor in cooperative relation with the table, parallel vertical posts fixed in the bed, and bearing portions on the head completely surrounding each of said posts.

2. In a milling machine, a bed, a work table supported on the bed, a head carrying a spindle and arbor in cooperative relation with the table, parallel vertical cylindrical posts fixed in the bed, and bearing portions on the head completely surrounding each of said cylindrical posts.

3. In a milling machine, a bed, a work table supported on the bed, a head carrying a spindle and arbor in cooperative relation with the table, parallel vertical posts fixed in the bed, and vertically spaced bearing portions on each side of the head, each bearing portion completely surrounding the respective post.

4. In a milling machine, a bed, a work table supported on the bed, a head carrying a spindle and arbor in cooperative relation with the table, parallel vertical cylindrical posts fixed in the bed, the head having elongated bearing portions on each side thereof surrounding the respective posts, said bearing portions being split adjacent each end and provided with oppositely acting screws threaded into opposite sides thereof for adjusting the same, the intermediate parts of said bearing portions being cut away to provide relief around the posts.

5. In a milling machine, a bed, a work table supported on the bed, a head carrying a spindle and arbor in cooperative relation with the table, parallel vertical posts fixed in the bed, and bearing portions on the head completely surrounding each of said posts, and means to control the elevation of the head including a part carried at the end of one of said posts, and a member engaging the last named part and said head.

6. In a milling machine, a bed, a work table supported on the bed, a head carrying a spindle and arbor in cooperative relation with the table, and means for mounting the head for vertical movement relative to the table, said means comprising a hollow post engaged by one side of the head, a lever fulcrumed in fixed relation to the post and having one arm extending over the head and the other arm extending over the post, a connection between the head and the arm thereover, and a tension spring within the hollow post and connected to the arm of the lever thereover.

7. In a milling machine, a bed, a work table supported on the bed, a head carrying a spindle and arbor in cooperative relation with the table, and means for mounting the head for vertical movement relative to the table, said means comprising parallel cylindrical posts, one of said posts being hollow, the head being guided on said posts for vertical movement, a lever fulcrumed in fixed relation to the hollow post, and having one arm extending over the head and the other arm extending over the hollow post, a connection between the head and the arm thereover, and a tension spring within the holow post and connected to the arm of the lever thereover.

8. In a milling machine, a bed, a work table supported on the bed, a head carrying a spindle and arbor in cooperative relation with the table, and means for mounting the head for vertical movement relative to the table, said means comprising a hollow post engaged by one side of the head, a lever fulcrumed in fixed relation to the post and having one arm extending over the head and the other arm extending over the post, a connection between the head and the arm thereover, and a tension spring within the hollow post and connected to the arm of the lever thereover, the respective arms of the lever being at an angle to each other and arranged so that the arm over the post is approximately horizontal when the head is in its elevated position, and the arm over the head slants upwardly when the head is in its elevated position, the angle being calculated to approximately compensate for the increasing tension of the spring as it is stretched in lowering the head.

9. In a milling machine, a bed, a table supported on the bed, a head carrying a spindle and arbor in cooperative relation with the table, and means for mounting the head for vertical movement comprising a vertical post fixed in the bed and means on the head engaging the post for guiding it in its vertical movement, a lever fulcrumed in fixed relation to the post, means connecting the lever with the head for raising and lowering the head, a handle extension on the lever at an angle to the arm of the lever connected to the head, and means for adjusting the handle with respect to the lever.

10. In a milling machine, a bed, a table supported on the bed, a head carrying a spindle and arbor in cooperative relation with the table, and means for mounting the head for vertical movement comprising a vertical post fixed in the bed and means on the head engaging the post for guiding it in its vertical movement, a lever fulcrumed in fixed relation to the post, means connecting the lever with the head for raising and lowering the head, a handle extension on the lever at an angle to the arm of the lever connected to the head, and the connection of the handle to the lever comprising a cylindrical socket extending longitudinally with respect to the arm of the lever, and means to fix the handle in any desired angular relation in said socket.

11. In a milling machine, a bed, a table supported on the bed, a head carrying a spindle and arbor in cooperative relation with the table, and means for mounting the head for vertical movement comprising a vertical post fixed in the bed and means on the head engaging the post for guiding it in its vertical movement, a lever fulcrumed in fixed relation to the post, means connecting the lever with the head for raising and lowering the head, a handle extension on the lever at an angle to the arm of the lever connected to the head, means for adjusting the handle with respect to the lever, and means to connect the lever to the head at any one of a plurality of selected points on the head.

12. In a milling machine, a bed, a table supported on the bed, a head carrying a spindle and arbor in cooperative relation with the table, a vertical post mounted on the bed, means on the head engaging the post and vertically slidable with respect to the post, a lever fulcrumed in fixed relation to the post, means connecting the head to the arm of the lever on one side of its fulcrum, and a spring operatively connected to the arm of the lever on the other side of its fulcrum and tending to counterbalance the weight of the head, the two arms of the lever being at an angle to each other and the parts being arranged to vary the leverage of the spring tending to lift the head as the lever is moved to compensate for the varying force of the spring as it lengthens and shortens.

13. In a milling machine, a bed, a table supported on the bed, a head carrying a spindle and arbor in cooperative relation with the table, a vertical post mounted on the bed, means on the head engaging the post and vertically slidable with respect to the post, a lever fulcrumed in fixed relation to the post, a link connecting the head to the lever, counterbalancing means acting through the lever to counterbalance the weight of the head, the lever being movable to move the head through only a part of the distance the head is movable on the post, and said connecting link being adjustable whereby the travel of the head controlled by the lever may be for any selected portion of its path on the post.

14. In a milling machine, a bed, a work table supported on the bed, a head carrying a spindle and arbor in cooperative relation with the table, parallel vertical posts fixed in the bed, bearing portions on the head completely surrounding each of said posts, a drive shaft parallel with said posts, a gear mounted in the head and splined on the drive shaft, and driving connections between said gear and the spindle.

15. In a milling machine, a bed, a work table supported on the bed, a head carrying a spindle and arbor in cooperative relation with the table, parallel vertical posts fixed in the bed, bearing portions on the head completely surrounding each of said posts, a drive shaft parallel with said posts, a gear mounted in the head and splined on the drive shaft, driving connections between said gear and the spindle, said driving connections comprising a countershaft parallel with the spindle, the spindle including a shaft extending from its end opposite to the arbor, and meshing gears splined upon the counter-shaft and spindle shaft.

16. In a milling machine, a spindle having an arbor at one end and a driving connection at the other end, said driving connection comprising a rotatable collar having keys fixed thereto, means to prevent axial movement of the collar, a driving gear splined on the outside of said keys, and the inner side of the keys working in keyways in the shaft of the spindle.

17. In a milling machine, a bed, parallel vertical posts fixed in the bed, a head having portions surrounding said posts, means for adjusting the head vertically on the posts, said head being provided with a horizontal spindle and arbor, means for driving the spindle, means for adjusting the spindle longitudinally, a table mounted on the bed beneath the arbor, and means for adjusting the table horizontally in a direction transversely of the spindle, said table extending away from the posts as far as any portion of the bed.

18. In a milling machine, a bed, a work table supported on the bed, a head carrying a spindle and arbor in cooperative relation with the table, parallel vertical posts fixed in the bed and bearing portions on the head completely surrounding each of said posts, the weight of said head being substantially equally divided between the front and the rear of the posts.

19. In a milling machine, a bed, a work table supported on the bed, a head carrying a spindle and arbor in cooperative relation with the table, parallel vertical posts fixed in the bed, bearing portions on the head completely surrounding each of said posts, manual means for raising and lowering the head, and counter-balancing means for substantially counter-balancing the weight of the head, the weight of the head being divided substantially equally on the front and rear of the posts whereby the tendency of the head to tilt is reduced to a minimum.

ARTHUR B. BOK.